(12) United States Patent
Neet

(10) Patent No.: US 11,038,391 B2
(45) Date of Patent: Jun. 15, 2021

(54) DISTRIBUTED CASCADED WINDING FOR ELECTRIC MACHINES

(71) Applicant: BorgWarner Inc., Auburn Hills, MI (US)

(72) Inventor: Kirk Neet, Pendleton, IN (US)

(73) Assignee: BorgWarner Inc., Auburn Hills, MI (US)

(*) Notice: Subject to any disclaimer, the term of this patent is extended or adjusted under 35 U.S.C. 154(b) by 462 days.

(21) Appl. No.: 16/136,407

(22) Filed: Sep. 20, 2018

(65) Prior Publication Data

US 2019/0020237 A1   Jan. 17, 2019

Related U.S. Application Data

(63) Continuation of application No. 13/974,591, filed on Aug. 23, 2013, now Pat. No. 10,110,078.

(51) Int. Cl.
*H02K 3/28* (2006.01)
*H02K 3/12* (2006.01)

(52) U.S. Cl.
CPC ............. *H02K 3/12* (2013.01); *H02K 3/28* (2013.01)

(58) Field of Classification Search
CPC .............. H02K 3/28; H02K 3/12; H02K 3/00
USPC ................. 310/179, 184, 195, 198, 200–208
See application file for complete search history.

(56) References Cited

U.S. PATENT DOCUMENTS

| | | |
|---|---|---|
| 6,882,077 B2 | 4/2005 | Neet |
| 6,894,417 B2 * | 5/2005 | Cai .................... H02K 3/12 310/198 |
| 2004/0061400 A1 | 4/2004 | Fukushima et al. |
| 2006/0032040 A1 | 2/2006 | Neet |
| 2006/0226727 A1 | 10/2006 | Bramson et al. |
| 2011/0001373 A1 | 1/2011 | Mod et al. |

(Continued)

FOREIGN PATENT DOCUMENTS

| | | |
|---|---|---|
| CN | 1531167 A | 9/2004 |
| CN | 101515733 A | 8/2009 |

(Continued)

OTHER PUBLICATIONS

State Intellectual Property Office of the People's Republic of China, Office Action for Application No. 201410605755, dated Dec. 22, 2017, 20 pages.

(Continued)

*Primary Examiner* — Quyen P Leung
*Assistant Examiner* — Alexander Moraza
(74) *Attorney, Agent, or Firm* — Bose McKinney & Evans LLP

(57) ABSTRACT

A stator includes a cylindrical core with a plurality of longitudinally extending slots, a first winding set formed as a first cascaded wire in two radial layers of the slots, a second winding set formed as a second cascaded wire in two other radial layers of the slots, and a jumper connecting the first and second wires. A first winding set may have three cascaded phase wires in first and second layers of the slots, and a second winding set may have three cascaded phase wires in third and fourth layers of the slots. A winding set of a first phase may have a first cascaded wire in two radial layers of a first one of the slots, and a winding set of a second phase may have a second cascaded wire in two other radial layers of the first one of the slots.

25 Claims, 7 Drawing Sheets

(56) References Cited

U.S. PATENT DOCUMENTS

2011/0241472 A1   10/2011  Tanaka et al.
2012/0146447 A1*  6/2012  Seguchi .................. H02K 3/04
                                                                   310/198

FOREIGN PATENT DOCUMENTS

| CN | 102668333 A | 9/2012 |
| CN | 202524205 U | 11/2012 |
| JP | 2012222874 A | 11/2012 |

OTHER PUBLICATIONS

Coil Pitch Article, http://www.davidsonsales.com/docs_pdf/CoilPitch. pdf, May 3, 2005, 5 pages.

* cited by examiner

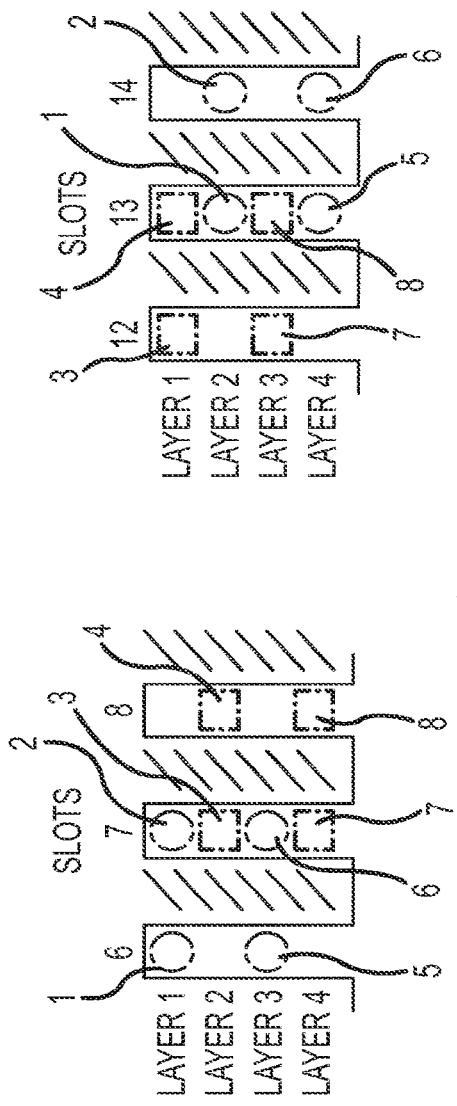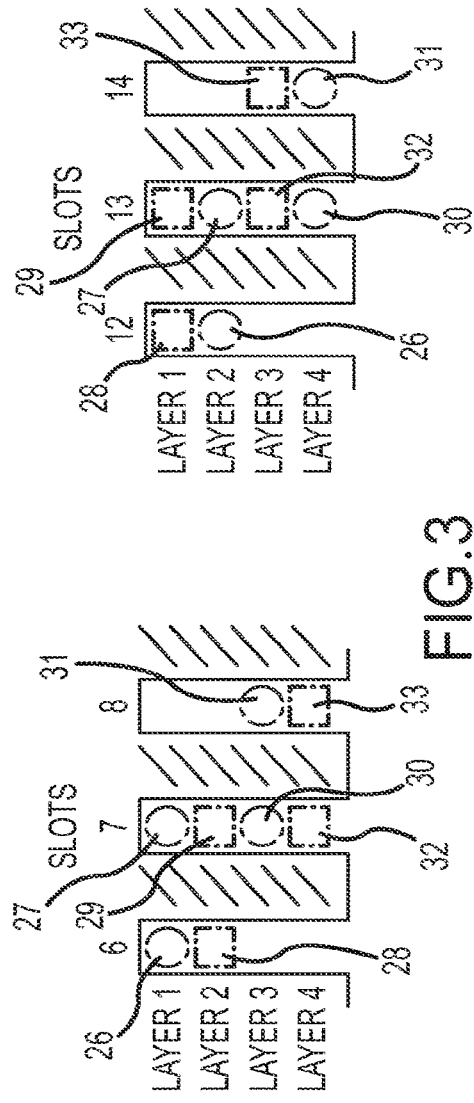

DISTRIBUTED CASCADED WINDING FOR ELECTRIC MACHINES

CROSS REFERENCE TO RELATED APPLICATIONS

This is a continuation of application Ser. No. 13/974,591 filed Aug. 23, 2013 entitled DISTRIBUTED CASCADED WINDING FOR ELECTRIC MACHINES the disclosure of which is hereby incorporated herein by reference.

BACKGROUND

Exemplary embodiments pertain to reducing costs and simplifying manufacturing of stator windings of electric machines and, more particularly, to achieving high machine efficiency and high manufacturing efficiency with cascaded wiring of a stator winding.

Dynamoelectric machines in automotive applications include alternators, alternator-starters, traction motors, and others. The stator of an electric machine typically includes a cylindrical core formed as a stack of individual laminations and having a number of circumferentially spaced slots that extend axially through the stator core. A rotor assembly includes a center shaft and is coaxial with the stator core. The stator core has wires wound thereon in the form of windings that extend axially through ones of the core slots. End turns are formed in the windings at the two axial ends of the stator core, a given winding having an end loop as it extends circumferentially to a different slot. In this general manner, a stator winding extends axially from end to end in selected ones of the plurality of stator core slots and extends circumferentially between slots, according to a chosen wiring pattern.

The stator may be formed with any number of separate phase windings, such as three-phase, five-phase, six-phase, etc., and such determines the general wiring pattern to be implemented when winding the stator core. Since most applications emphasize reducing the size of the electric machine while improving efficiency, it is desirable to utilize the available slots in a manner that maximizes the filling of the stator core slots. High slot fill stators generally produce more electrical power with increased machine efficiency. Use of rectangular conductor wire may achieve a slot fill ratio of 75% or greater. Hairpin conductors are U-shaped solid wires having a substantially rectangular cross-sectional profile that are inserted into two slots at one axial end of the stator core and that are twisted and then welded to other hairpins at the other axial end of the stator core, as part of a phase winding. However, use of hairpin conductors may require a tradeoff between achieving a high slot fill ratio and reducing undesirable AC performance characteristics such as skin effect and others. Skin effect reduces the effective cross-sectional area of a conductor in a slot as the thickness of the conductor increases. Therefore, generally, the thickness of rectangular wires in a slot should be made as small as possible. Alternatively, a given wiring configuration may be designed to greatly reduce undesirable performance, for example by placing more than one phase in a slot.

Manufacturing problems and associated increased costs may also be encountered when forming and welding hairpin conductors. For example, connecting the ends of hairpins at one axial end of a stator typically requires a large number of welds. In addition, each hairpin may be required to be staggered or interleaved with respect to adjacent hairpin end portions, and the insertions, bending, and routing of individual hairpins necessitate a large number of manufacturing steps.

SUMMARY

It is therefore desirable to obviate the above-mentioned disadvantages by providing a stator winding configuration that may be employed in a simple, distributed manner. The disclosed exemplary embodiments utilize cascaded continuous wire in forming two or more distributed sections, whereby the sections may be joined together with a minimum of interconnections such as welds.

According to an exemplary embodiment, a stator includes a substantially cylindrical core having two axial ends and a plurality of longitudinally extending slots formed therebetween, a first winding set formed as a first cascaded wire in two radial layers of the slots, a second winding set formed as a second cascaded wire in two other radial layers of the slots, and a jumper connecting the first and second wires.

According to another exemplary embodiment, a stator includes a substantially cylindrical core having two axial ends and a plurality of longitudinally extending slots formed therebetween, a first winding set formed as three cascaded phase wires in first and second layers of the slots, and a second winding set formed as three cascaded phase wires in third and fourth layers of the slots.

According to a further exemplary embodiment, a stator includes a substantially cylindrical core having two axial ends and a plurality of longitudinally extending slots formed therebetween, a first winding set of a first phase formed as a first cascaded wire in two radial layers of a first one of the slots, and a second winding set of a second phase formed as a second cascaded wire in two other radial layers of the first one of the slots.

The foregoing summary does not limit the invention, which is defined by the attached claims. Similarly, neither the Title nor the Abstract is to be taken as limiting in any way the scope of the claimed invention.

BRIEF DESCRIPTION OF THE DRAWING FIGURES

The above-mentioned aspects of exemplary embodiments will become more apparent and will be better understood by reference to the following description of the embodiments taken in conjunction with the accompanying drawings, wherein:

FIG. 2 illustrates an exemplary distributed winding pattern for a stator core having four radial slot layers;

FIG. 3 illustrates another exemplary distributed winding pattern for a stator core having four radial slot layers;

Corresponding reference characters indicate corresponding or similar parts throughout the several views.

DETAILED DESCRIPTION

The embodiments described below are not intended to be exhaustive or to limit the invention to the precise forms disclosed. Rather, the embodiments are chosen and described so that others skilled in the art may appreciate and understand the principles and practices of these teachings.

Figure 1:
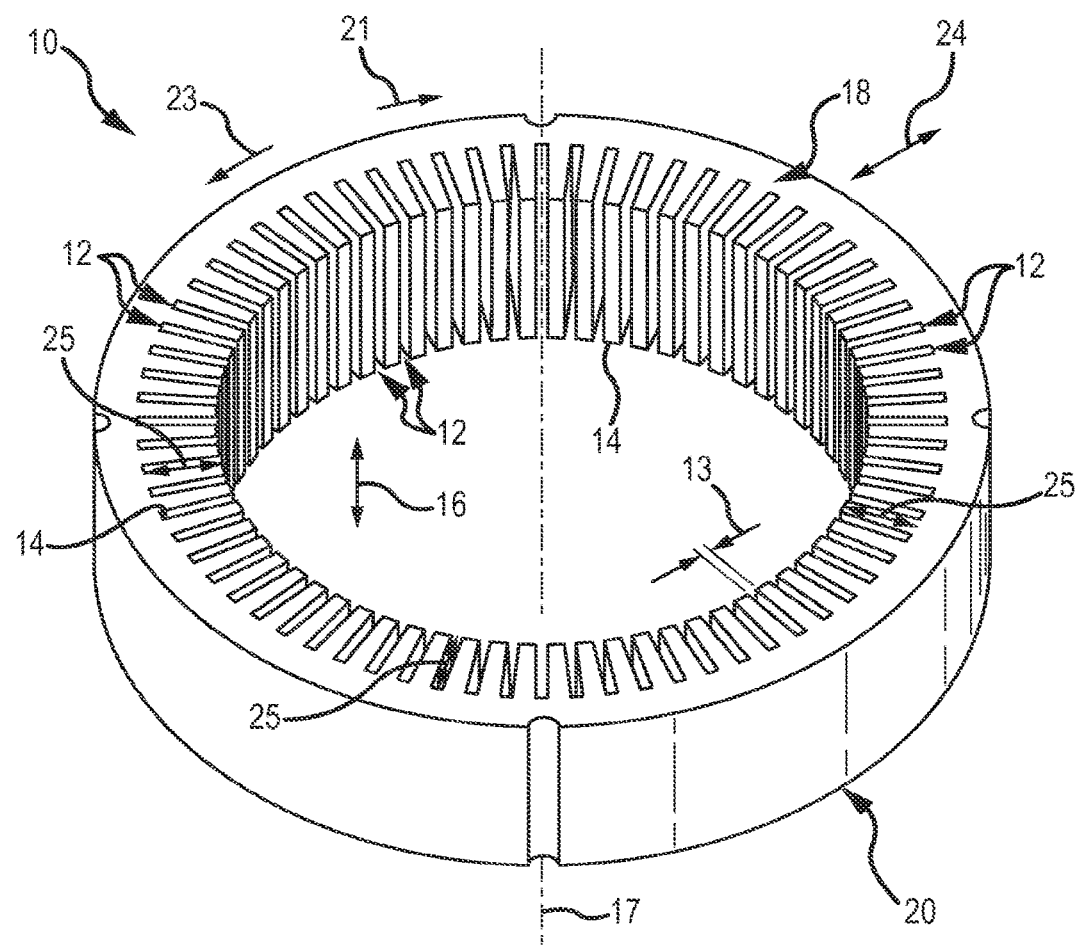
FIG. 1 is a perspective view of an exemplary stator core.

FIG. 1 is a perspective view of a generally cylindrically-shaped stator core 10. Stator core 10 includes a plurality of core slots 12 extending radially outward of a circumferential interior surface 14 thereof. Core slots 12 extend in a direction, indicated by an arrow 16, relative to the central axis 17 of stator core 10 between a first axial end 18 and a second axial end 20 thereof. An axially upward direction is defined as moving toward first axial end 18 and an axially downward direction is defined as moving toward second axial end 20. Core slots 12 are typically equally spaced around circumferential inner surface 14, and inner surfaces 14 between core slots 12 are typically substantially parallel to the central axis 17. A circumferential clockwise direction is indicated by an arrow 21 and a circumferential counterclockwise direction is indicated by an arrow 23. Core slots 12 define a depth 25 along a radial axis, indicated by an arrow 24, and are adapted to receive a stator winding, discussed in more detail below. A radial inward direction is defined as moving towards central axis 17 of stator core 10 and a radial outward direction is defined as moving away from central axis 17.

FIG. 2 illustrates an exemplary distributed winding pattern for a stator core having four radial slot layers. A phase "A" wire pair 1, 2 are disposed in layer one at slots six and seven and in layer two at slots thirteen and fourteen, thereby spanning a pitch of seven slots. A phase "B" wire pair 3, 4 are disposed in layer two at slots seven and eight and in layer one at slots twelve and thirteen, thereby spanning a pitch of five slots. This pattern for phases A and B is duplicated for layers three and four. A phase A wire pair 5, 6 are disposed in layer three at slots six and seven and in layer four at slots thirteen and fourteen, thereby spanning a pitch of seven slots. A phase B wire pair 7, 8 are disposed in layer four at slots seven and eight and in layer three at slots twelve and thirteen, thereby spanning a pitch of five slots. Since this first exemplary distributed wiring pattern may have different pitches for separate phase windings, it is herein referred to as being non-symmetric or unequal.

FIG. 3 illustrates another exemplary distributed winding pattern for a stator core having four radial slot layers. A phase A wire pair 26, 27 are disposed in layer one at slots six and seven and in layer two at slots twelve and thirteen, thereby spanning a pitch of six slots. A phase B wire pair 28, 29 are disposed in layer two at slots six and seven and in layer one at slots twelve and thirteen, thereby spanning a pitch of six slots. This pattern for phases A and B is duplicated for layers three and four. A phase A wire pair 30, 31 are disposed in layer three at slots seven and eight and in layer four at slots thirteen and fourteen, thereby spanning a pitch of six slots. A phase B wire pair 32, 33 are disposed in layer four at slots seven and eight and in layer three at slots thirteen and fourteen, thereby spanning a pitch of six slots. Since this second exemplary distributed wiring pattern may have substantially the same pitches for separate phase windings, it is herein referred to as being symmetric or equalized.

The exemplary stator winding patterns illustrated in FIGS. 2 and 3 are each amenable to being placed by use of separate wiring magazines, thereby effecting a distributed winding. For example, the windings of layers one and two may be placed onto a stator core and then the windings of layers three and four may be placed in a separate winding operation. However, these patterns each require interlacing of conductors as the conductor pairs are sequentially placed during assembly. Such interlaced windings are typically implemented using hairpin type conductor segments that are connected at one axial end of stator core 10. The hairpin manufacturing process includes welding each conductor leg to an adjacent conductor leg, and the large number of individual welds increases the probability of defects and reduces reliability and consistency of the winding. The use of hairpin conductor segments also typically requires bending and routing of hairpin legs in a staggered or interleaved pattern that may add axial length to a stator assembly and that may cause additional likelihood of shorts or other product defects.

Figure 4:
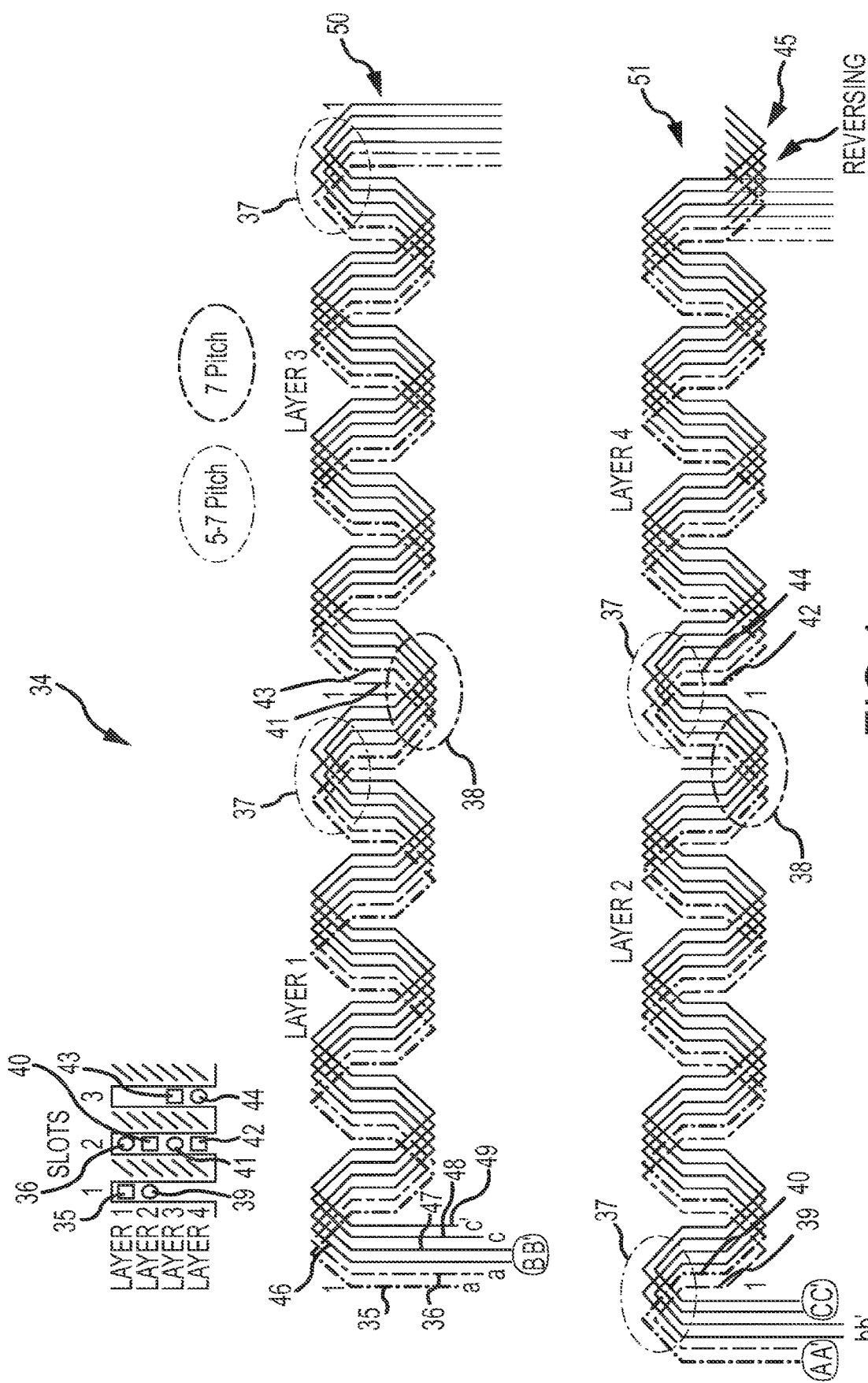
FIG. 4 shows a wiring schematic for a distributed cascaded stator winding prior to insertion, and a slot fill pattern for one phase, according to an exemplary embodiment.
Figure 5:
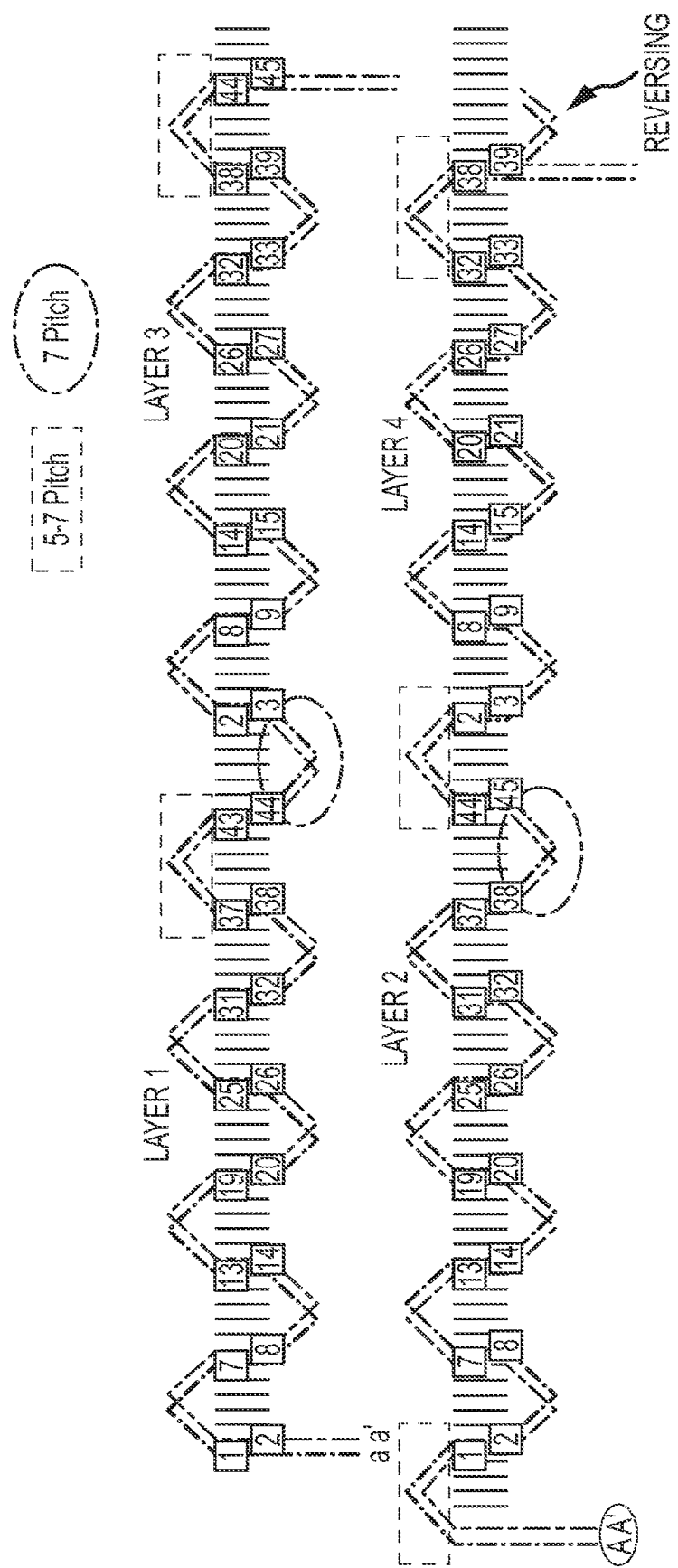
FIG. 5 shows slot locations for one phase of an exemplary stator winding.

FIG. 4 shows a wiring schematic for a distributed cascaded stator winding 34 laid out in a linear manner for ease of visualization, and a slot fill pattern for phase A that references slots numbered one, two, and three, according to an exemplary embodiment. FIG. 5 is a wiring schematic for the exemplary distributed cascaded stator winding pattern of FIG. 4, except that only one phase (phase A) is shown with slot numbers for each layer, for phase A wires passing through the core. The illustrated pattern is designed for a stator core having 48 circumferential slots, but any other multiple of six slots may alternatively be utilized. A phase A wire pair 35, 36 are respectively disposed in layer one at slots one and two, and the wires respectively extend to layer one at slots seven and eight, each wire thereby spanning a pitch of six slots. A subsequent circumferential portion of the cascaded wiring of phase A pair 35, 36 extends at a pitch of six slots, except where noted. Specifically, a 5-7 pitch wiring section 37 is implemented two times as phase A wires 35, 36 complete two revolutions around stator core 10. For example, wire 35 has a pitch of seven slots in layer one by being sequentially placed in slot thirty-seven and slot forty-four, and wire 36 has a pitch of five slots in layer one by being sequentially placed in slot thirty-eight and slot forty-three. Wires 35, 36 pass through 5-7 pitch wiring section 37 in layer one and are then configured as a seven pitch wiring section 38 at a transition between layer one and layer three. Similarly, wires 35, 36 pass through 5-7 pitch wiring section 37 in layer four and are then configured as a seven pitch wiring section 38 at a transition between layers four and two. The combination of 5-7 pitch wiring section 37 and seven pitch wiring section 38 serves to transition between a layer having conductor 35 as an outer conductor, for a group of six wires, and a next layer having conductor 36 as the outer conductor. A reversing section 45 is provided for changing the circumferential direction of the cascaded winding between layer three and layer four. Reversing section 45 may be formed as integral continuous wires, or it may be a section of pairs of wires joined together, such as by welding or any appropriate joining procedure.

The reference numbers 35, 36, 39-44 refer to conductor portions in a section view; for example, conductor portions 35 and 43 are portions of the same wire. Conductor portion 39, at slot one in layer two, may be an extension of conductor 36. Conductor portion 40, at slot two in layer two, may be an extension of conductor 35. Conductor portion 41, at slot two in layer three, may be an extension of conductor 36. Conductor portion 42, at slot two in layer four, may be an extension of conductor 35. Conductor portion 43, at slot three in layer three, may be an extension of conductor 35. Conductor portion 44, at slot three in layer four, may be an extension of conductor 36. This pattern repeats around slots 12 of stator core 10, whereby phase A fills all layers in slot two, fills the radial outer half of a left adjacent slot (i.e., slot one), and fills the radially inner half of a right adjacent slot (i.e., slot three). In general, the distributed winding is characterized in that each phase has "X" number of radial slot positions/segments in a "full" slot (i.e., a slot filled with conductors of one phase), X/2 slot positions/segments in the radially outward portion of the left adjacent slot, and X/2 slot positions/segments in the radially inward portion of the right adjacent slot.

Each of six phase wires 35, 36, 46-49 of stator winding 34 is cascaded, meaning that at least three consecutive conductor portions of one conductor are housed in a same layer of the slots. This allows, for at least a portion of the windings, each of the conductors to be placed into slots of stator core 10 in a sequential order. The conductors are, therefore, not interleaved. The conductors may also be formed of a continuous wire. For example, conductors 35, 36, 46-49 may be formed into a zig-zag shape while being positioned as shown for layer one and layer three as a first distributed winding 50, and then conductors 35, 36, 46-49 may be positioned on top of winding 50 (note: for clarity, winding 51 is shown below winding 50) for layers two and four as a second distributed winding 51. Individual slot sections of the winding may be placed into the appropriate slots of stator core 10.

Reversing section 45 may be formed for interconnecting distributed windings 50, 51, or an interconnection may be formed at one or more different location(s). The circumferential direction of winding installation is reversed, such as by changing from a counter-clockwise circumferential direction to a clockwise circumferential direction. Reversing section 45 may change the relative orientation of phase wires 35, 36, 46-49 by forming one or more loops whereby, for example, a cascade wiring order defined by the aforementioned zig-zag shaping may be changed between layers three and four. Any radial adjustments for conductor portions may be readily implemented for a chosen wiring pattern.

Figure 6:
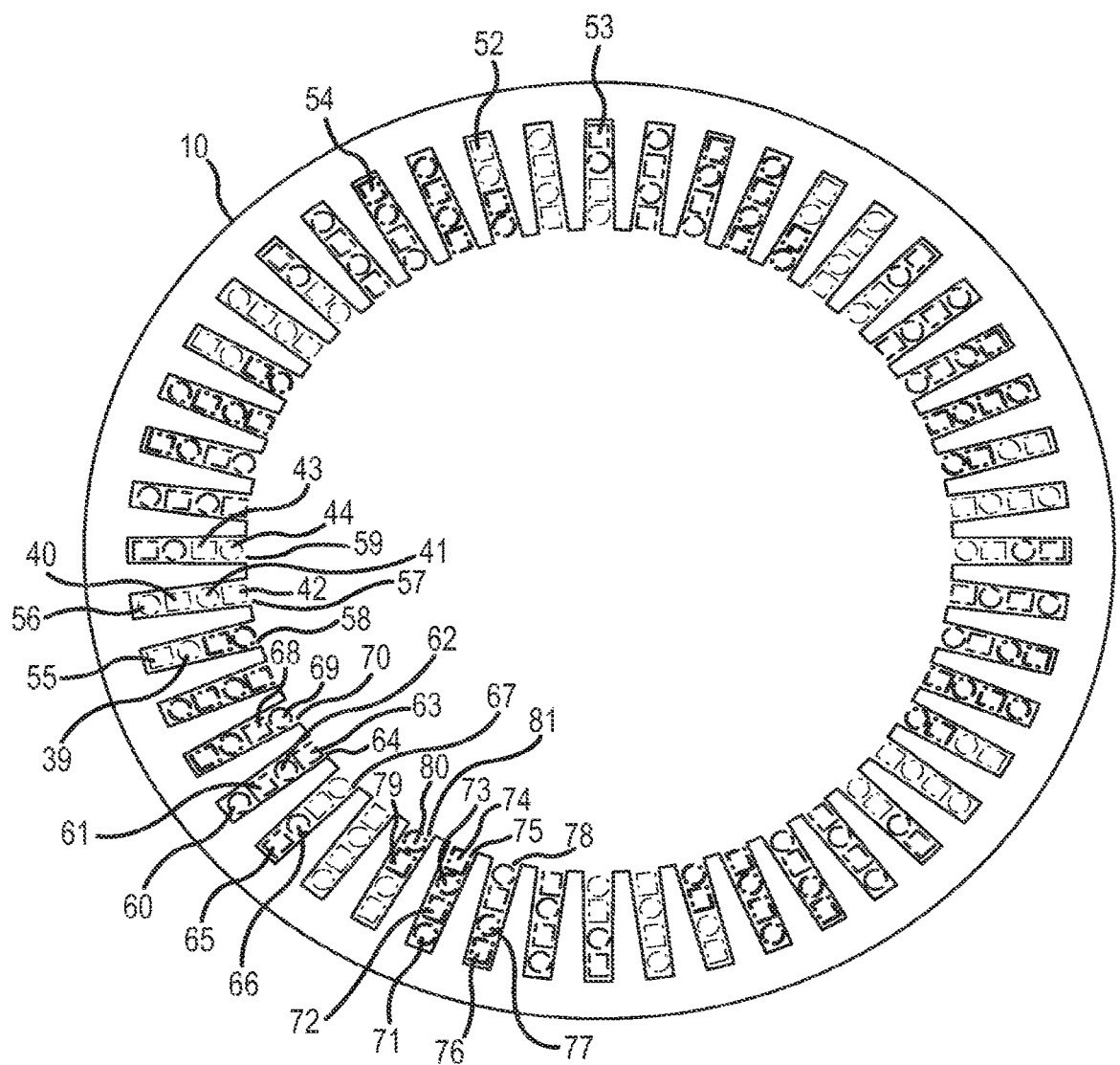
FIG. 6 is a top plan view of a fully populated stator core, according to an exemplary embodiment.

FIG. 6 is a top plan view of a fully populated stator core 10, according to an exemplary embodiment. Conductor wire(s) for phase "A" are illustrated using light hashed symbols 52, conductor wire(s) for phase "B" are illustrated using medium density hashed symbols 53, and conductor wire(s) for phase "C" are illustrated using dark hashed symbols 54. Phase A conductor segments 40-42, 56 fill the four layers of a slot 57. Phase A conductor segments 39, 55 till the radially outer two layers of left-wise adjacent slot 58, and phase A conductor segments 43, 44 fill the radially inner two layers of right-wise adjacent slot 59. Phase B conductor segments 60-63 fill the four layers of a slot 64. Phase B conductor segments 65, 66 fill the radially outer two layers of left-wise adjacent slot 67, and phase B conductor segments 68, 69 fill the radially inner two layers of right-wise adjacent slot 70. Phase C conductor segments 71-74 fill the four layers of a slot 75. Phase C conductor segments 76, 77 fill the radially outer two layers of left-wise adjacent slot 78, and phase C conductor segments 79, 80 fill the radially inner two layers of right-wise adjacent slot 81. The distributed winding for a three phase stator as shown in FIG. 6 thereby implements the general slot fill pattern of FIG. 4. Specifically, each full slot 57, 64, 75 has "X" radial slot positions each filled with conductors of one phase; each respective radially outer two layers of a corresponding left-wise adjacent slot 58, 67, 78 have "X/2" conductor segments of the same one phase; and, each respective radially inner two layers of a corresponding right-wise adjacent slot 59, 70, 81 have "X/2" conductor segments of the same one phase.

Figure 7:
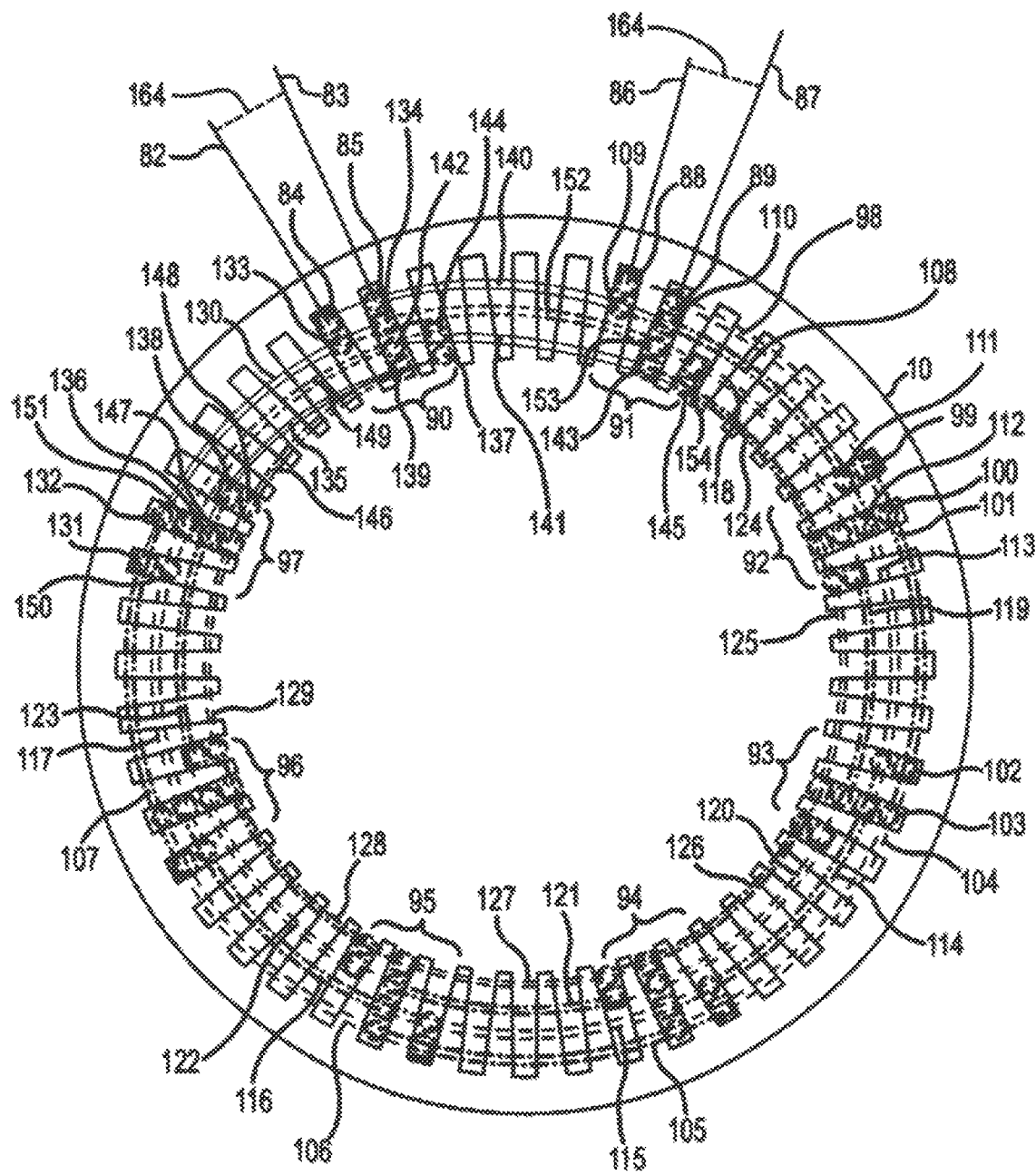
FIG. 7 is a top plan view showing a cascaded winding for a single phase, according to an exemplary embodiment.

FIG. 7 is a top plan view showing a cascaded winding for a single phase (e.g., phase A), according to an exemplary embodiment. The first wire of the single phase is shown as a round conductor and has extending lead wires 87, 83. The second wire of the same single phase is shown as a rectangular conductor having extending lead wires 86, 82. Although shown for illustration purposes in FIG. 7 as having different cross-sectional shapes, the actual wires in most applications have the same shape. For purposes of increasing slot fill ratio, the shape of the wire is typically rectangular, but may alternatively be square, round, or any other shape. Once the winding is completed, these two wires are connected in parallel. For example, jumpers 164 (shown in dashed lines in FIG. 7) or the like may be used to connect extending lead wires 86, 87 together and to connect extending lead wires 82, 83 together, in a parallel configuration. In an alternative embodiment, the two wires may be connected in series by connecting together extending lead wires 82, 83 or by connecting together extending lead wires 86, 87. For ease of description, each conductor segment shown in FIG. 7 is not uniquely identified, but the associated groups of conductor segments are identified, and each such group represents a slot fill pattern as described above in the immediately preceding paragraph and in FIGS. 4 and 6. Three-slot groups 90-97 are located about the circumference of stator core 10, and represent portions of the phase A winding that pass through slots in stator core 10.

The circumferential span between groups 91 and 97 may be formed without connections, and the wire routing between sequential groups alternates between stator core axial end 18 and stator core axial end 20 (FIG. 1). Specifically, wiring section 98 is routed along stator core bottom 20 as a pair of wire portions respectively formed between layer one slot segments 88, 89 and layer one slot segments 99, 100. The next sequential wiring section 101 is routed along stator core top 18 as a pair of wire portions respectively formed between layer one slot segments 99, 100 and layer one slot segments 102, 103. This same wire routing pattern continues in a clockwise direction, so that wiring section 104 passes along stator core bottom 20 as a pair of wire portions respectively formed between layer one slot segments 102, 103 and the pair of layer one slot segments in group 94. Wiring section 105 passes along stator core top 18 as a pair of wire portions respectively formed between layer one slot segments of group 94 and the pair of layer one slot segments in group 95. Wiring section 106 passes along stator core bottom 20 as a pair of wire portions respectively formed between layer one slot segments of group 95 and the pair of layer one slot segments in group 96. Wiring section 107 passes along stator core top 18 as a pair of wire portions respectively formed between layer one slot segments of group 96 and the pair of layer one slot segments in group 97.

The top/bottom alternating pattern described in the preceding paragraph is inverted for layer two sections, is repeated for layer three sections, and is inverted for layer four sections. Specifically, wiring section 108 is routed along stator core top 18 as a pair of wire portions respectively formed between layer two slot segments 109, 110 and layer two slot segments 111, 112. The next sequential wiring section 113 is routed along stator core bottom 20 as a pair of wire portions respectively formed between layer two slot segments 111, 112 and the two respective layer two slot segments of group 93. This same wire routing pattern continues in a clockwise direction, so that wiring section 114 passes along stator core top 18 as a pair of wire portions respectively formed between layer two slot segments of group 93 and the pair of layer two slot segments in group 94. Wiring section 115 passes along stator core bottom 20 as a pair of wire portions respectively formed between layer two slot segments of group 94 and the pair of layer two slot segments in group 95. Wiring section 116 passes along stator core top 18 as a pair of wire portions respectively formed between layer two slot segments of group 95 and the pair of layer two slot segments in group 96. Wiring section 117 passes along stator core bottom 20 as a pair of wire portions respectively formed between layer two slot segments of group 96 and the pair of layer two slot segments in group 97.

Regarding layer three wire routing, wiring section 118 is routed along stator core bottom 20 as a pair of wire portions respectively formed between the two layer three slot segments of group 91 and the two layer three slot segments of group 92. The next sequential wiring section 119 is routed along stator core top 18 as a pair of wire portions respectively formed between the two layer three slot segments of group 92 and the two layer three slot segments of group 93. This same wire routing pattern continues in a clockwise direction, so that wiring section 120 passes along stator core bottom 20 as a pair of wire portions respectively formed between layer three slot segments of group 93 and the pair of layer three slot segments in group 94. Wiring section 121 passes along stator core top 18 as a pair of wire portions respectively formed between layer three slot segments of group 94 and the pair of layer three slot segments in group 95. Wiring section 122 passes along stator core bottom 20 as a pair of wire portions respectively formed between layer three slot segments of group 95 and the pair of layer three slot segments in group 96. Wiring section 123 passes along stator core top 18 as a pair of wire portions respectively formed between layer three slot segments of group 96 and the pair of layer three slot segments in group 97.

Regarding layer four wire routing, wiring section 124 is routed along stator core top 18 as a pair of wire portions respectively formed between the two layer four slot segments of group 91 and the two layer four slot segments of group 92. The next sequential wiring section 125 is routed along stator core bottom 20 as a pair of wire portions respectively formed between the two layer four slot segments of group 92 and the two layer four slot segments of group 93. This same wire routing pattern continues in a clockwise direction, so that wiring section 126 passes along stator core top 18 as a pair of wire portions respectively formed between the two layer four slot segments of group 93 and the pair of layer four slot segments in group 94. Wiring section 127 passes along stator core bottom 20 as a pair of wire portions respectively formed between layer four slot segments of group 94 and the pair of layer three slot segments in group 95. Wiring section 128 passes along stator core top 18 as a pair of wire portions respectively formed between layer four slot segments of group 95 and the pair of layer four slot segments in group 96. Wiring section 129 passes along stator core bottom 20 as a pair of wire portions respectively formed between layer four slot segments of group 96 and the pair of layer four slot segments in group 97.

A 5-7 pitch wiring section 130 is formed between the two layer one slot segments of group 97 and the two layer two slot segments of group 90. As a result, a seven-slot pitch exists between group 97 slot segment 131 and group 90 slot segment 134, and a five-slot pitch exists between group 97 slot segment 132 and group 90 slot segment 133. A 5-7 pitch wiring section 135 is formed between the two layer three slot segments of group 97 and the two layer four slot segments of group 90. As a result, a seven-slot pitch exists between group 97 slot segment 136 and group 90 slot segment 137, and a five-slot pitch exists between group 97 slot segment 138 and group 90 slot segment 139. A 5-7 pitch wiring section 140 is formed between the two layer one slot segments of group 90 and the two layer two slot segments of group 91. As a result, a seven-slot pitch exists between group 90 slot segment 84 and group 91 slot segment 110, and a five-slot pitch exists between group 90 slot segment 85 and group 91 slot segment 109. A 5-7 pitch wiring section 141 is formed between the two layer three slot segments of group 90 and the two layer four slot segments of group 91. As a result, a seven-slot pitch exists between group 90 slot segment 142 and group 91 slot segment 143, and a five-slot pitch exists between group 90 slot segment 144 and group 91 slot segment 145.

A reversing loop 146 is formed between the two layer four slot segments 147, 148 of group 97 and two corresponding layer four slot segments 139, 137 of group 90. As a result, the clockwise wiring direction of the wire pair at wiring section 129 changes, at slot segments 139, 137, to a counter-clockwise wiring direction at 5-7 pitch wiring section 135. Such also effects a wiring transition between layers three and four.

A seven pitch wiring section 149 is formed between the two layer two slot segments 150, 151 of group 97 and the two layer three slot segments 142, 144 of group 90, thereby effecting a wiring transition between layers two and three. A seven pitch wiring section 152 is formed between the two layer two slot segments 133, 134 of group 90 and the two layer three slot segments 153, 154 of group 91, thereby also effecting a wiring transition between layers two and three.

Figure 8:
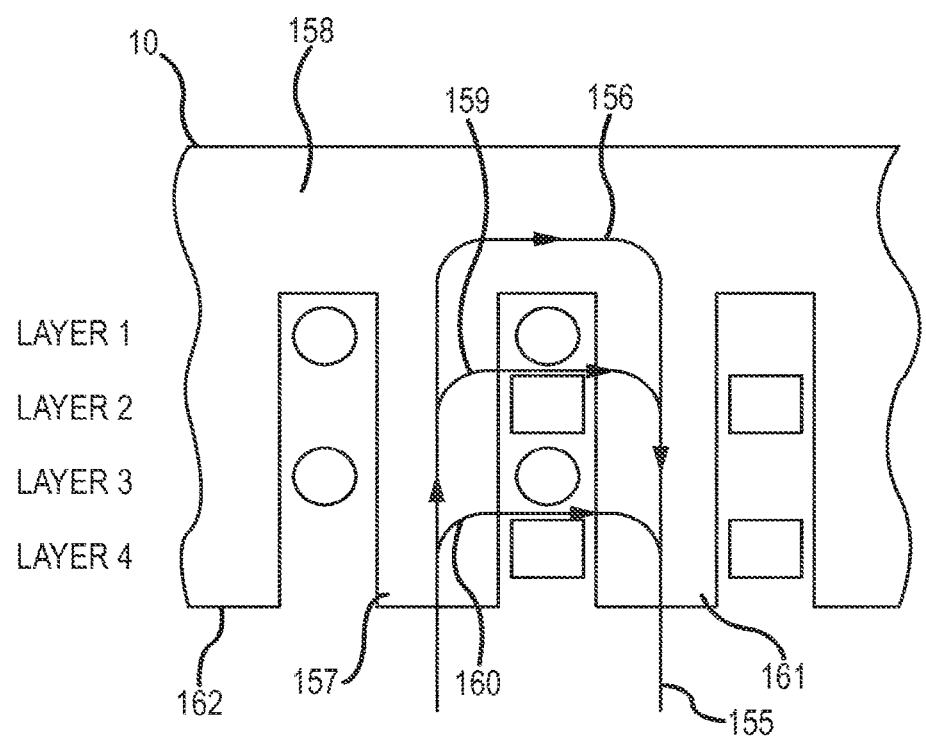
FIG. 8 illustrates exemplary flux paths in a partial top plan view of the stator winding of FIG. 2.

FIG. 8 illustrates exemplary flux paths in a partial top plan view of the stator winding of FIG. 2. In a typical bifilar machine (i.e., having two wires in parallel), it is desirable for each filar to have substantially the same average radial position within the slot segments as the other filar of the bifilar winding pair. This is so because as flux travels down a stator tooth toward the back iron portion of a stator core. For example, an aggregate 155 of flux lines at a given slot of stator core 10 includes flux 156 that travels down a stator tooth 157 towards the back iron 158, and also includes flux 159, 160 that jumps across the slot to an adjacent stator tooth 161. As a result, the wires closer to the stator core interior surface 162 are linked by more flux than the wires located closer to the back (i.e., radially outer portion) of a slot. In such a case, there is a different voltage generation in each wire, and this variation causes circulating currents to travel around a given wire instead of being directed through the wires for providing useable electric power. The flux leakage thereby reduces the efficiency of an electrical machine.

Conventionally, the stator windings may be formed in an interlaced pattern that routes conductors between layers so that the average radial distances for the respective conductors is approximately the same. Another conventional stator winding may route conductors so that each slot contains currents of different phases and skin effects are thereby reduced. By comparison, the cascaded wires of the presently disclosed embodiments are not interlaced and therefore are not oriented with different radial offsets. For example, a bifilar winding in an exemplary embodiment may have a first filar circumferentially routed along layer one and a second filar circumferentially routed along layer two. By extending the cascaded layer one windings sequentially to layers three, four, and two (e.g., FIG. 4), and by selective placement of 5-7 pitch portions, seven pitch portions, and a reversing loop, a slot segment pattern is provided where the average radial distance of the slot segments of filar one is roughly the same as the average radial distance of the slot segments of filar two. As a result of providing the same average radial distance for each filar of a winding, the associated voltage generation becomes equalized and machine efficiency is improved. For example, pulsations in stator current and deviations in voltage across a winding are reduced because any differences in flux leakage between filars produce associated voltage fluctuations that become normalized as they are distributed around the circumference of the stator as a bifilar winding.

While various embodiments incorporating the present invention have been described in detail, further modifications and adaptations of the invention may occur to those skilled in the art. However, it is to be expressly understood that such modifications and adaptations are within the spirit and scope of the present invention.

What is claimed is:

1. A stator, comprising:
 a substantially cylindrical core having two axial ends and a plurality of longitudinally extending slots formed therebetween;
 a first wire disposed about substantially the entire circumference of the core, is disposed in a radial layer other than a radially outermost layer of a first slot of the plurality of slots and in a radially outermost layer of a second slot of the plurality of slots and one other radial layer of the second slot, the second slot being circumferentially adjacent to the first slot;
 a second wire disposed about substantially the entire circumference of the core, is disposed in the radially outermost layer of the first slot and is disposed in two radial layers other than the radially outermost layer of the second slot;
 wherein the first and second wires define a first plurality of slot groups of circumferentially adjacent slots wherein the first plurality of slot groups are circumferentially distributed about the stator core and define a first phase and wherein the first and second wires are disposed in a set of circumferentially adjacent slots including the first and second slots which define a first one of the slot groups of the first plurality of slot groups;
 wherein, between the first one of the first plurality of slot groups and a circumferentially adjacent second one of the first plurality of slot groups, the first and second wires define first and second end loops wherein, at a first one of the axial ends of the cylindrical core, the first wire defines the first end loop which has a pitch of N+1 and exits from the first slot and enters a slot disposed N+1 slots in a first circumferential direction from the first slot whereby there are N slots disposed between the slots exited and entered by the first end loop and wherein, at the first one of the axial ends, the second wire defines the second end loop which has a pitch of N−1 and exits from the second slot and enters a slot disposed N−1 slots in the first circumferential direction from the second slot whereby there are N−2 slots disposed between the slots exited and entered by the second end loop; and
 wherein the first and second wires each define N pitch end loops between the second one of the first plurality of slot groups and a circumferentially adjacent third one of the first plurality of slot groups and between the first one of the first plurality of slot groups and a circumferentially adjacent fourth one of the first plurality of slot groups wherein the third one of the first plurality of slot groups is disposed in the first circumferential direction relative to the second one of the first plurality of slot groups and the fourth one of the first plurality of slot groups is in the opposite circumferential direction relative to the first one of the first plurality of slot groups, and wherein there are N−1 slots disposed between the slots exited and entered by the first and second wires for each of the N pitch end loops.

2. The stator of claim 1 wherein the first and second wires are disposed in at least one additional layer in a slot of the first one of the first plurality of slot groups.

3. The stator of claim 2 wherein N is 6.

4. The stator of claim 2 wherein the first and second wires each define a cascaded winding.

5. The stator of claim 2 wherein the first wire comprises an integral continuous wire that extends for at least one revolution about the stator.

6. The stator of claim 2 wherein the first wire extends for at least two revolutions about the stator.

7. The stator of claim 6 wherein the first wire is defined by an integral continuous wire.

8. The stator of claim 1 wherein a jumper connects the first and second wires and wherein the first and second wires include at least one reversing end loop section.

9. The stator of claim 1 wherein each of the first plurality of slot groups is defined by three circumferentially adjacent slots.

10. The stator of claim 9 wherein the stator defines a plurality of phases and the middle slot of each of the plurality of slot groups includes wires from only the first phase.

11. The stator of claim 10 wherein the two slots other than the middle slot of each of the plurality of slot groups includes wires from more than one phase.

12. The stator of claim 11 wherein every other slot of the stator contains wires from only one phase.

13. The stator of claim 9 wherein the first one of the first plurality of slot groups includes a third slot disposed adjacent the second slot with the second slot disposed between the first and third slots and wherein the radially innermost and the radially second innermost layers are filled by the first and second wires.

14. The stator of claim 13 wherein the first wire fills the radially innermost layer of the third slot and the second wire fills the radially second innermost layer of the third slot.

15. The stator of claim 14 wherein the first wire is disposed in half of the layers of the second slot and the second wire is disposed in the other half of the layers of the second slot and wherein the first and second wires alternate layers in the second slot.

16. The stator of claim 14 wherein the radially innermost and radially second innermost layers of the first slot and the radially outermost layer and the radially second outermost layer of the third slot are all filled by wires defining one or more phases other than the first phase.

17. The stator of claim 16 where there are three phases and the wires disposed in the radially innermost and radially second innermost layers of the first slot define a second phase and the wires disposed in the radially outermost layer and the radially second outermost layer of the third slot define a third phase.

18. The stator of claim 17 wherein N is six.

19. The stator of claim 13 wherein the first and second wires are disposed in the second slot X number of slot positions and are disposed in the first slot X/2 number of slot positions and are disposed in the third slot X/2 number of slot positions.

20. The stator of claim 19 wherein each slot defines X number of layers and X number of slot positions.

21. The stator of claim 20 wherein the stator defines three phases, X is four and N is six.

22. The stator of claim 21 wherein the first wire fills the radially innermost layer of the third slot and the second wire fills the radially second innermost layer of the third slot.

23. The stator of claim 22 wherein the first and second wires alternate layers in the second slot.

24. The stator of claim 23 wherein the radially innermost and radially second innermost layers of the first slot and the radially outermost layer and the radially second outermost layer of the third slot are all filled by wires defining one or more phases other than the first phase.

25. The stator of claim 24 where there are three phases and the wires disposed in the radially innermost and radially second innermost layers of the first slot define a second phase and the wires disposed in the radially outermost layer and the radially second outermost layer of the third slot define a third phase.

* * * * *